United States Patent
Stiehler et al.

(10) Patent No.: US 10,060,275 B2
(45) Date of Patent: Aug. 28, 2018

(54) TURBOMACHINE BLADE ARRANGEMENT WITH FIRST AND SECOND GUIDES WITH RESPECTIVE MOVABLE FIRST AND SECOND ELEMENTS TO REDUCE VIBRATIONAL RESPONSE

(71) Applicant: MTU Aero Engines AG, Munich (DE)

(72) Inventors: Frank Stiehler, Bad Liebenwerda (DE); Martin Pernleitner, Dachau (DE); Andreas Hartung, Munich (DE)

(73) Assignee: MTU AERO ENGINES AG, Munich (DE)

( * ) Notice: Subject to any disclaimer, the term of this patent is extended or adjusted under 35 U.S.C. 154(b) by 144 days.

(21) Appl. No.: 14/801,264

(22) Filed: Jul. 16, 2015

(65) Prior Publication Data

US 2016/0024945 A1 Jan. 28, 2016

(30) Foreign Application Priority Data

Jul. 22, 2014 (DE) .................. 10 2014 214 271

(51) Int. Cl.
*F01D 5/30* (2006.01)
*F01D 5/26* (2006.01)
(Continued)

(52) U.S. Cl.
CPC ............. *F01D 5/30* (2013.01); *F01D 5/16* (2013.01); *F01D 5/22* (2013.01); *F01D 5/26* (2013.01);
(Continued)

(58) Field of Classification Search
CPC ..... F01D 5/12; F01D 5/16; F01D 5/22; F01D 5/225; F01D 5/26; F01D 5/30; F05D 2260/96; F05D 2260/961
See application file for complete search history.

(56) References Cited

U.S. PATENT DOCUMENTS 2,349,187 A * 5/1944 Meyer ............... F01D 5/16 188/322.5
6,827,551 B1 * 12/2004 Duffy ............... F01D 5/16 415/119
(Continued)

FOREIGN PATENT DOCUMENTS

DE   102009010185 A1 *  8/2010 ............... F01D 5/16
WO   2012095067 A1      7/2012
WO   WO 2012095067 A1 * 7/2012 ............... F01D 5/16

OTHER PUBLICATIONS

Machine Translation of DE 102009010185 A1.*
Translation of WO 2012095067 A1.*

*Primary Examiner* — Woody Lee, Jr.
*Assistant Examiner* — Elton Wong
(74) *Attorney, Agent, or Firm* — Barlow, Josephs & Holmes, Ltd.

(57) ABSTRACT

The present invention relates to a turbomachine blade (100; 200) with a base element, which has a blade part (1) for flow diversion and a blade root (2), a first guide (110; 210), fixed on the base element, in which a first element (111; 211) is movably guided, and a second guide (120; 220), fixed on the base element, in which a second element (121; 221) is movably guided, wherein a dynamic of the first element in the first guide and a dynamic of the second element in the second guide are designed differently, and the first guide (110; 210) is arranged in a half, nearer to the base root, of a radial height (H) of the base element, and the second guide is arranged in a half, more remote from the blade root, of the radial height of the base element.

16 Claims, 1 Drawing Sheet

(51) Int. Cl.
   *F01D 5/22*       (2006.01)
   *F01D 5/16*       (2006.01)
   *F16F 15/00*      (2006.01)

(52) U.S. Cl.
   CPC .. *F05D 2250/241* (2013.01); *F05D 2260/961* (2013.01); *F05D 2300/607* (2013.01); *F16F 15/00* (2013.01); *Y02T 50/671* (2013.01)

(56) References Cited

U.S. PATENT DOCUMENTS

| | | |
|---|---|---|
| 2002/0064458 A1 | 5/2002 | Montgomery |
| 2005/0047917 A1* | 3/2005 | Brock ................. F01D 5/225 416/220 R |
| 2013/0058785 A1* | 3/2013 | Kellerer ................. F01D 5/16 416/1 |
| 2013/0280064 A1* | 10/2013 | van Steinvoren ....... F03D 1/008 416/1 |
| 2013/0294913 A1* | 11/2013 | Campbell ............... F01D 5/16 416/145 |

* cited by examiner

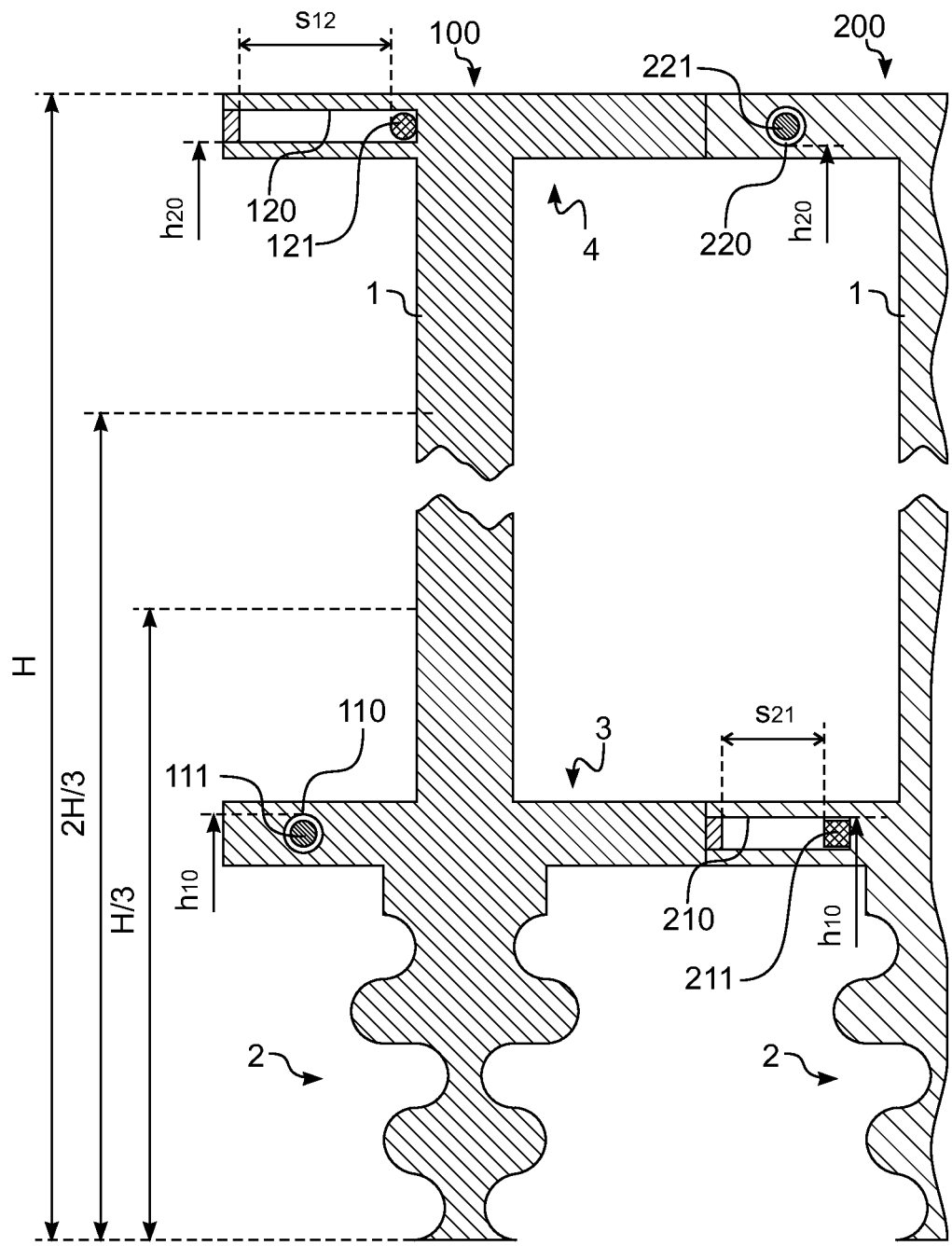

TURBOMACHINE BLADE ARRANGEMENT WITH FIRST AND SECOND GUIDES WITH RESPECTIVE MOVABLE FIRST AND SECOND ELEMENTS TO REDUCE VIBRATIONAL RESPONSE

BACKGROUND OF THE INVENTION

The work that led to this invention was funded under Grant Agreement No. CSJU-GAM-SAGE-2008-001 as part of the European Union's Seventh Framework Program (FP7/2007-2013) for the Clean Sky Joint Technology Initiative.

The present invention relates to a turbomachine blade having a base element, which is a blade part for flow diversion and a blade root, a first guide fixed to the base element, in which a first element is movably guided, and a second guide fixed to the base element, in which a second element is movably guided, a turbomachine blade arrangement having at least two such turbomachine blades, a gas turbine having at least one such turbomachine blade, in particular at least one such turbomachine blade arrangement, and a method for designing such a turbomachine blade and turbomachine blade arrangement.

Known from WO 2012/095067 A1 is a turbomachine blade having a tuning element guide, in which a tuning element, which is provided for impact contact, is movably guided. As explained in WO 2012/095067 A1, it is possible in this way to detune advantageously a characteristic frequency of the blade in that, under certain operating conditions, the tuning element begins to deliver impacts.

In order to reduce the consequences of vibrational excitation for different resonant frequencies and/or excitations, WO 2012/095067 A1 proposes that a plurality of tuning element guides and/or the tuning elements that are movably guided by them be constructed differently. In doing so, WO 2012/095067 A1 suggests a near-root arrangement as being especially advantageous.

BRIEF SUMMARY OF THE INVENTION

An object of an embodiment of the present invention is to provide an improved turbomachine.

This object is achieved by a turbomachine blade of the present invention. The present invention sets forth a turbomachine blade arrangement having such turbomachine blades, a gas turbine having such turbomachine blades or turbomachine blade arrangements, and a method for designing such a turbomachine blade or turbomachine blade arrangement. Advantageous embodiments of the invention are discussed in detail below.

According to an aspect of the present invention, a turbomachine blade has a base element having a blade part for flow diversion and a blade root. The base element can have a one-part design or a multiple-part design; in particular it can be or can become primarily shaped, preferably cast-molded, or produced by machining. The blade root can be joined to a rotor or casing of a turbomachine, in particular a gas turbine, in a detachable manner, in particular in a form-fitting and/or friction-fitting manner, or permanently, in particular in a cohesive manner; in particular, it is or will be designed to be formed integral to it.

The turbomachine blade has a first guide fixed to the base element, in which a first element is movably guided, and a second guide fixed to the base element, in which a second element is movably guided. The first and/or second guide can each become designed or can be designed, in particular in full or in part, to be integral with and, in particular, on, preferably in, the base element. In one embodiment, the first and/or second guide will be or is respectively designed, in particular in full or in part, separately and is fastened to the base element in a detachable manner or permanently, in particular in a cohesive manner.

A dynamic of the first element in the first guide and a dynamic of the second element in the second guide are or will be designed differently. In this way, it is possible advantageously to take into account multiharmonic excitations in particular. Thus, for example, a machine arrangement can cross different modes, such as, for instance, a first bending characteristic frequency and a first torsional characteristic frequency. When the dynamic of the one element in its guide on a machine arrangement and/or mode and the dynamic of the other element in its guide on another machine arrangement and/or mode will be or are tuned, it is possible to improve and, in particular, to reduce any vibrational response of the turbomachine blade to such a multiharmonic excitation.

According to an aspect of the present invention, the first guide is or will be arranged in a half nearer to the blade root, in particular in a third closest to the blade root, preferably a quarter closest to the blade root, of a radial height of the base element, and the second guide is arranged in a half most remote from the blade root, in particular in a third most remote from the blade root, preferably in a quarter most remote from the blade root, of the radial height of the base element.

In this way, in one embodiment, the dynamic of the first element in the first guide can become or can be tuned in an advantageous way to a characteristic shape, which has high amplitudes particularly in a region near to the blade root and can be correspondingly strongly influenced there, whereas the dynamic of the second element in the second guide can become or can be tuned to another characteristic shape, which has high amplitudes particularly in a region remote from the blade root and can be correspondingly strongly influenced there. In other words, the arrangement of the first guide and the radial opposite-lying arrangement of the second guide can simultaneously enable respective optimal sites to be used for influencing the vibrational response of different modes and/or machine arrangements.

Additionally or alternatively, in one embodiment, it is possible in an advantageous way, to use the opposite-lying arrangement of the first and second guides to reduce any centrifugal force load, in that, for example, the second element that is more remote from the blade root will be or is designed to be lighter and its play of movement to be less or the same.

In one embodiment, a radial height of the base element is defined by the maximum dimension of the base element in the radial direction of the turbomachine between a surface point of the base element that is radially innermost or closest to the axis of rotation and a surface point of the base element that is radially outermost or most remote from the axis of rotation. If the turbomachine blade is a rotating blade that is separately constructed and can be joined in a detachable manner or permanently to the rotor, in particular a bonded rotating blade, then the radial height of its base element is the radial dimension from a radially inner end face of its blade root to a radially outer surface of a blade tip of the shroudless blade part or a radially outer surface of an outer shroud of the blade part, in particular a radially outward arranged sealing fin on the outer shroud. Correspondingly, the radial height of the base element of a guide vane that is separately constructed and can be joined in a detachable manner or permanently to the rotor, in particular a bonded guide vane, is the radial dimension from a radially outer end face of its blade root to a radially inner surface of a blade tip of the shroudless blade vane or a radially inner surface of a shroud of the blade vane, in particular a radially inward arranged sealing fin on the shroud. If the turbomachine blade is a rotating blade that is constructed to be integral with the rotor, then the radial height of its base element is the radial dimension from a radially inner jacket surface of the rotor to a radially outer surface of a blade tip of the shroudless blade part or a radial outer surface of an outer shroud of the blade part, in particular a radially outward arranged sealing fin on the outer shroud. If the turbomachine is a guide vane constructed to be integral with the casing, then the radial height of its base element is the radial dimension from a radial outer jacket surface of a gas duct of the casing to a radially inner surface of a blade tip of the shroudless blade part or a radially inner surface of a shroud of the blade vane, in particular a radially inward arranged sealing fin on the shroud.

In one embodiment, the first guide will be or is arranged on a shroud that is radially adjacent to the blade part, in particular on a radially inward or inner shroud. Additionally or alternatively, the first guide will be or is arranged on a side, facing away from the blade part, of the shroud radially adjacent to the blade part, in particular on a radially inner side of an inner shroud. Additionally or alternatively, in one embodiment, the second guide is or will be arranged on a shroud radially adjacent to the blade part, in particular a radial outward or outer shroud. Additionally or alternatively, the second guide is or will be arranged on a side, facing away from the blade part, of the shroud radially adjacent to the blade part, in particular on a radially outward side of the outer shroud.

Inner and outer shrouds offer an advantageous place, in particular a large structured space and/or a site that is especially near to or remote from the blade root, for the first and second guides, respectively.

The dynamic of the first element in the first guide and the dynamic of the second element in the second guide can become or can be differently designed in various ways.

In particular, in one embodiment, a main movement direction of the second guide, in which the second element has maximum play, with a main movement axis of the first guide, in which the first element exhibits maximum play, can form an angle that is at least 15°, in particular at least 30°. In this way, for example, the main impact directions of tuning elements, which are provided with their guide for impact contact, or else the main frictional directions of damping elements, which are provided in their guide for dissipative movement, can become or can be each optimally oriented for different characteristic shapes.

In one embodiment, the main movement direction of the second guide can form together with a radial, axial, or peripheral direction an angle that is at most 30°, in particular at most 10°. Correspondingly, in an enhancement, the main movement direction of the first guide can form together with another one of the radial, axial, or peripheral direction an angle that is at most 30°, in particular at most 10°. Thus, for example, the main movement direction of the second guide can be directed substantially in the peripheral direction and the main movement direction of the first guide can be directed substantially in the axial direction, so that the two of them form an angle of about 90° with each other.

Additionally or alternatively to a different orientation of a main movement direction, the dynamic of the first element in the first guide and the dynamic of the second element in the second guide can become or can be designed differently in that the elements exhibit different maximum play and thus correspondingly different acceleration paths for impact or friction paths.

Correspondingly, in one embodiment, a maximum play of the one element in its guide is at least 1.1 times, in particular at least 1.5 times, a maximum play of the other element in its guide. Correspondingly, in one embodiment, a maximum play of the first element in the first guide is at least 1.1 times, in particular at least 1.5 times, a maximum play of the second element in the second guide. In another embodiment, a maximum play of the second element in the second guide is, vice versa, 1.1 times, in particular at least 1.5 times, a maximum play of the first element in the first guide.

Equally, the first element and the first guide as well as the second element and the second guide can also be geometrically similar and, in particular, can become or can be designed with the same movement play, in particular in order to simplify their production, when their dynamics will be or are differently designed, for example, through different movement directions, different weights, or the like. Correspondingly, in one embodiment, a maximum play of the first element in the first guide deviates from a maximum play of the second element in the second guide by at most 10%, in particular at most 1%.

Additionally or alternatively to a different orientation of a main movement direction and/or a different maximum play, the dynamic of the first element in the first guide and the dynamic of the second element in the second guide can become or can be designed differently in that the elements have different weights and thus correspondingly different impulses for impact or frictional forces.

Correspondingly, in one embodiment, a weight of the first element deviates from a weight of the second element by at least 10%. In an enhancement, the first element that is closer to the blade root is heavier, so as, in particular, to reduce any centrifugal force load of a rotating blade. In another enhancement, the second element that is more remote from the blade root is heavier, so as, in particular, to achieve a higher excitation of a rotating blade.

Equally, the first element and the second element can also become or can be designed similarly in order to simplify their production, when their dynamics will be or are designed differently, for example, through different main movement directions, different maximum plays, or the like. Correspondingly, in one embodiment, a weight of the first element deviates from a weight of the second element by at most 10%, in particular at most 1%.

Additionally or alternatively to a different orientation of a main movement direction, different maximum play, and/or different weights, the dynamic of the first element in the first guide and the dynamic of the second element in the second guide can become or can be designed differently in that the elements have different dimensions and/or adhesion friction coefficients and thus correspondingly different contact geometries for impacts or frictional ratios.

Correspondingly, in one embodiment, the first and second elements and/or the first and second guides have maximum dimensions that deviate from each other by at least 10%. A maximum dimension is, for example, the diameter of a spherical element, a diagonal of a cubic element, a depth of a cylindrical slot, and the like.

Additionally or alternatively, in one embodiment, the first element and the first guide have with respect to each other a first adhesion friction coefficient, and the second element and the second guide have with respect to each other a second adhesion friction coefficient, wherein the first and second adhesion friction coefficients deviate by at least 10% from each other.

Equally, the elements and/or the guides can become or can be designed also with similar dimensions and/or adhesion friction coefficients in particular, in order to simplify their production, when their dynamics will be or are designed differently through different main movement directions, different weights, different maximum plays, or the like. Correspondingly, in one embodiment, a maximum dimension of the first element deviates from a maximum dimension of the second element by at most 10%, in particular at most 1%. Additionally or alternatively, in one embodiment, the first and second adhesion friction coefficients deviate from each other by at most 10%, in particular at most 1%.

In one embodiment, the first and second elements have a different geometric shape or contour. Thus, for example, one of the elements can be designed to be spherical and the other element can be designed to be cylindrical.

The first and second elements can each be tuning elements, which are provided for impact contact with their guide, such as described, in particular, in the initially discussed WO 2012/095067 A1. Equally, the first and second elements can each be damping elements, which are provided for dissipative frictional contact with their guide. In another embodiment, the first element is a tuning element, which is provided for impact contact with its first guide, and the second element is a damping element, which is provided for dissipative frictional contact with its second guide, or, vice versa, the first element is a damping element, which is provided for dissipative frictional contact with its first guide, and the second element is a tuning element, which is provided for impact contact with its second guide.

In particular for this purpose, in one embodiment, a maximum play of the first and/or second element in its guide is at least three times a play of this element in one or a plurality of directions, in particular all directions that are perpendicular to a main movement direction in which the first and/or second element exhibits this maximum play. In particular, therefore, the first and/or second element in its guide can exhibit a macroscopic degree of freedom of movement in the main movement direction, whereas, in the other directions, it preferably exhibits a play fit so as to enable and perform a movement in the degree of freedom of movement.

In another embodiment, a maximum play of the first and/or second element in its guide deviates from a play of the first and/or second element in one or a plurality of directions, in particular all directions that are perpendicular to a main movement direction in which the first and/or second element exhibits this maximum play by at most 10%. In particular, therefore, the first and/or second element in its guide can exhibit three translational degrees of freedom of movement.

According to an aspect of the present invention, a turbomachine blade arrangement has a first one of the turbomachine blades described here as well as a second one of the turbomachine blades described here, which is adjacent in the peripheral direction. In one embodiment, the dynamic of the first element in the first guide of the first turbomachine blade and the dynamic of the first element in the first guide of the second turbomachine blade are or will be designed differently in the way described here. Additionally or alternatively, the dynamic of the second element in the second guide of the first turbomachine blade and the dynamic of the second element in the second guide of the second turbomachine blade are or will be designed differently in the way described here.

In this way, in one embodiment, an especially effective detuning of the blades with respect to one another can advantageously be achieved. Additionally or alternatively, in one embodiment, it is possible in this way to improve and, in particular, to reduce the vibrational response of the turbomachine blade arrangement to a multiple multiharmonic excitation.

In particular, the first and/or second guide of the first and/or second turbomachine blade of the turbomachine blade part arrangement can be or can become arranged on a shroud radially adjacent to the blade part and/or on a side, facing away from the blade part, of a shroud radially adjacent to the blade part.

Additionally or alternatively, a main movement direction of the first guide of the first blade in which the first element of the first blade exhibits maximum play, together with a main movement direction of the first guide of the second blade in which the first element of the second blade exhibits maximum play form an angle of at least 15°, in particular at least 30°. Additionally or alternatively, a main movement direction of the second guide of the first blade in which the second element of the first blade exhibits maximum play, together with a main movement direction of the second guide of the second blade in which the second element of the second blade exhibits maximum play can form an angle of at least 15°, in particular at least 30°.

Additionally or alternatively, a maximum play of the first element in the first guide of the first blade can be at least 1.1 times, in particular at least 1.5 times, a maximum play of the first element in the first guide of the second blade, and/or a maximum play of the second element in the second guide of the first blade can be at least 1.1 times, in particular at least 1.5 times, a maximum play of the second element in the second guide of the second blade.

Additionally or alternatively, a weight of the first element of the first blade can deviate from a weight of the first element of the second blade, and/or a weight of the second element of the first blade can deviate from a weight of the second element of the second blade by at least 10%.

Additionally or alternatively, the first element and/or the first guide of the first blade can have a maximum dimension and/or an adhesion friction coefficient that deviates by at least 10% from a maximum dimension or an adhesion friction coefficient of the first element and/or of the first guide of the second blade. Additionally or alternatively, the second element and/or the second guide of the first blade can have a maximum dimension and/or an adhesion friction coefficient that deviates by at least 10% from a maximum dimension or an adhesion friction coefficient of the second element and/or of the second guide of the second blade.

Additionally or alternatively, the first element of the first blade and the first element of the second blade can have a different geometric shape or contour. Additionally or alternatively, the second element of the first blade and the second element of the second blade can have a different geometric shape or contour.

Additionally or alternatively, a maximum play of the first and/or second element of the first and/or second blade in its guide can be respectively at least three times a play of the first and/or second element in at least one direction that is perpendicular to the main movement direction in which the first and/or second element exhibits this maximum play, or can deviate by at most 10% from a play of this element in at least one direction that is perpendicular to the main movement direction in which the first and/or second element exhibits this maximum play.

According to an aspect of the present invention, a turbomachine blade described here, in particular a turbomachine blade arrangement described here, is a rotor blade or guide vane (arrangement) of a rotor blade or guide vane cascade of a compressor or turbine stage of a gas turbine, in particular of an aircraft engine.

BRIEF DESCRIPTION OF THE DRAWINGS

Additional advantageous enhancements of the present invention ensue from the dependent claims and the following description of preferred embodiments. Shown in partially schematic manner for this purpose is the single FIGURE:

FIG. 1 two turbomachine blades of a turbomachine blade arrangement of a gas turbine according to an embodiment of the present invention.

DETAILED DESCRIPTION OF THE INVENTION

FIG. 1 shows a first turbomachine blade 100 and (in part) a second turbomachine blade 200, adjacent to it in the peripheral direction (horizontal in FIG. 1), of a turbomachine blade arrangement of a gas turbine according to an embodiment of the present invention in a section perpendicular to an axis of rotation of the gas turbine.

The turbomachine blades 100, 200 each have a base element having a blade part 1 for flow diversion and a blade root 2.

The first turbomachine blade 100 has a first guide, which is fixed on the base element, in the form of a cylindrical blind hole 110 that is closed by a cover, in which a spherical first element 111 is movably guided, and a second guide, which is fixed on the base element, in the form of a cylindrical blind hole 120, which is closed by a cover, in which a spherical second element 121 is movably guided.

The second turbomachine blade 200 has, in a similar way, a first guide, which is fixed on the base element, in the form of a cylindrical blind hole 210, which is closed by a cover, in which a cylindrical first element 211 is movably guided, and a second guide, which is fixed on the base element, in the form of cylindrical blind hole 220, which is closed by a cover, in which a cylindrical second element 221 is movably guided.

A dynamic of the first element 111 in the first guide 110 of the first blade 100 and a dynamic of the second element 121 in the second guide 120 of the first blade 100 are designed differently. A dynamic of the first element 211 in the first guide 210 of the second blade 200 and a dynamic of the second element 221 in the second guide 220 of the second blade 200 are also designed differently. In addition, the dynamic of the first element 111 in the first guide 110 of the first blade 100 and the dynamic of the first element 211 in the first guide 210 of the second blade 200 are designed differently. The dynamic of the second element 121 in the second guide 120 of the first blade 100 and the dynamic of the second element 221 in the second guide 220 of the second blade 200 are also designed differently.

The first guide 110 or 210 is respectively arranged in a third, closest to the blade root, of a radial height H of the base element ($h_{10} \leq H/3$), while the second guide 120 or 220 is respectively arranged in a third that is most remote from the blade root ($2H/3 \leq h_{20}$).

The first guide 110 or 210 is respectively arranged on an inner shroud 3, which is radially adjacent to the blade part 1, on a side of this shroud that faces away from the blade part or is radially inward (bottom in FIG. 1). The second guide 120 or 220 is respectively arranged on an outer shroud 4, which is radially adjacent to the blade part 1, on a side of the outer shroud that faces away from the blade part or is radially outward (top in FIG. 1).

In the exemplary embodiment, a main movement direction of the second guide 120 of the first blade 100, in which the second element 121 exhibits maximum play $s_{12}$, is aligned in the peripheral direction (horizontal in FIG. 1) by way of example. A main movement direction of the first guide 110 of the first blade 100, in which the first element 111 exhibits maximum play, is aligned, by contrast, in the axial direction (perpendicular to the plane of the drawing in FIG. 1).

Vice versa, in the exemplary example, a main direction movement direction of the second guide 220 of the second blade 200, in which the second element 221 exhibits maximum play, is aligned in the axial direction by way of example, while a main movement direction of the first guide 210 of the second blade 200, in which the first element 211 exhibits maximum play $s_{21}$, is aligned, by contrast, in the peripheral direction.

As a result, the main movement directions of the first and second guides 110, 120 of the first blade 100 form an angle of about 90° with each other, while the main movement directions of the first and second guides 110, 120 of the second blade 200 also form an angle of about 90° with each other.

Additionally, the main movement direction of the first guide 110 of the first blade 100, in which the first element 111 of the first blade exhibits maximum play, forms an angle of about 90° with the main movement direction of the first guide 210 of the second blade 200, in which the first element 211 of the second blade 200 exhibits maximum play $s_{21}$, and the main movement direction of the second guide 120 of the first blade 100, in which the second element 121 of the first blade 100 exhibits maximum play $s_{12}$, also forms an angle of about 90° with the main movement direction of the second guide 220 of the second blade 200, in which the second element 221 of the second blade 200 exhibits maximum play.

The maximum play of the first element 111 in the first guide 110 of the first blade 100 is at least 1.5 times the maximum play $s_{12}$ of the second element 121 in the second guide 120 of the first blade 100 and at least 1.5 times the maximum play $s_{21}$ of the first element 211 in the first guide 210 of the second blade 200, as indicated in section in FIG. 1 for the first guides 110, 210.

The weight of the first element 111 of the first blade 100 is at least 1.5 times the weight of the second element 121 of the first blade 100 as well as at least 1.5 times the weight of the first element 211 of the second blade 200.

The first element 111 of the first blade 100 has a diameter that is at least 1.5 times the diameter of the second element 121 of the first blade 100 as well as at least 1.5 times the diameter of the first element 211 of the second blade 200.

In addition, the adhesion friction coefficient of the first element 111 in the first guide 110 of the first blade 100 is at least 1.5 times the adhesion friction coefficient of the second element 121 in the second guide 120 of the first blade 100 as well as at least 1.5 times the adhesion friction coefficient of the first element 211 in the first guide 210 of the second blade 200.

The maximum play of the first and second elements 111, 121, 211, and 221 in their respective guides 110, 120, 210, and 220 is at least three times a play of this element in the directions that are perpendicular to the main movement direction in which the first and/or second elements exhibit this maximum play.

Although, in the preceding description, exemplary embodiments were explained, it is noted that a large number of modifications are possible. Moreover, it is noted that the exemplary embodiments are merely examples, which are not intended to limit the protective scope, the applications, and the construction in any way. Instead, the preceding description provides the person skilled in the art with a guideline for implementing at least one exemplary embodiment, with it being possible to make diverse modifications, in particular in regard to the function and arrangement of the described components, without departing from the protective scope, as ensues from the claims and combinations of features equivalent to the latter.

The invention claimed is:

1. A turbomachine blade arrangement having:
a first blade having a base element, which has a blade part for flow diversion and a blade root;
a first guide, fixed on the base element of the first blade, in which a first element is movably guided; and
a second guide, fixed on the base element of the first blade, in which a second element is movably guided;
wherein a dynamic of the first element in the first guide and a dynamic of the second element in the second guide of the first blade are designed differently;
a second blade adjacent to the first blade, the second blade having a base element, which has a blade part for flow diversion and a blade root;
a first guide, fixed on the base element of the second blade, in which a first element is movably guided, the first guide of the second blade arranged substantially perpendicular to the first guide of the first blade;
a second guide, fixed on the base element of the second blade, in which a second element is movably guided, the second guide of the second blade arranged substantially perpendicular to the second guide of the first blade;
wherein a dynamic of the first element in the first guide and a dynamic of the second element in the second guide of the second blade are designed differently;
wherein
the first guide of the first blade and the first guide of the second blade are arranged in a half, nearer to the blade root, of a radial height (H) of the base element, respectively, and the second guide of the first blade and the second guide of the second blade are arranged in a half, more remote from the blade root, of the radial height of the base element, respectively.

2. The turbomachine blade arrangement according to claim 1, wherein the first and/or second guide of each respective blade is arranged on a shroud that is radially adjacent to the blade part and/or on a side, facing away from the blade part, of a shroud that is radially adjacent to the blade part.

3. The turbomachine blade arrangement according to claim 1, wherein a main movement direction of the second guide of the first blade in which the second element of the first blade exhibits maximum play, together with a main movement direction of the first guide of the first blade in which the first element of the first blade exhibits maximum play, forms an angle of at least 15°.

4. The turbomachine blade arrangement according to claim 1, wherein a maximum play of the second element in the second guide on the first blade is at least 1.1 times a maximum play of the first element in the first guide of the second blade or at least 1.1 times a maximum play of the first element of the first guide of the first blade.

5. The turbomachine blade arrangement according to claim 1, wherein a weight of the first element deviates from a weight of the second element by about 10% of each respective blade.

6. The turbomachine blade arrangement according to claim 1, wherein the first and second elements and/or the first and second guides have a maximum dimension and/or an adhesion friction coefficient that deviates by about 10% from each other of each respective blade.

7. The turbomachine blade arrangement according to claim 1, wherein the first and second elements of each respective blade have a different shape.

8. The turbomachine blade arrangement according to claim 1, wherein a maximum play of an element in its guide is at least three times a play of this element in at least one direction that is perpendicular to the main movement direction in which the element exhibits this maximum play.

9. The turbomachine blade arrangement according to claim 1, wherein at least one turbomachine blade is configured and arranged in at least one compressor or turbine stage with at least one rotor blade or guide vane cascade.

10. The turbomachine blade arrangement according to claim 1, wherein a maximum play of an element in its guide deviates by at most 10% from a play of this element in at least one direction that is perpendicular to a main movement direction in which the element exhibits this maximum play.

11. The turbomachine blade arrangement according to claim 1, wherein a main movement direction of the second guide of the first blade in which the second element of the first blade exhibits maximum play, together with a main movement direction of the second guide of the second blade in which the second element of the second blade exhibits maximum play forms an angle of at least 15°.

12. The turbomachine blade arrangement according to claim 1, wherein a maximum play of the first element in the first guide of the first blade is at least 1.1 times a maximum play of the first element in the first guide of the second blade or a maximum play of the second element in the second guide of the first blade is at least 1.1 times a maximum play of the second element in the second guide of the second blade.

13. The turbomachine blade arrangement according to claim 1, wherein a maximum play of the first element in the first guide on a blade deviates from a maximum play of the second element in the second guide on the same blade by at most 1%.

14. The turbomachine blade arrangement according to claim 1, wherein a main movement direction of the first element of the first guide of the first blade is perpendicular to a main movement direction of the second element of the second guide of the first blade.

15. The turbomachine blade arrangement according to claim 1, wherein a main movement direction of the first element of the first guide of the first blade is perpendicular to a main movement direction of the first element of the first guide of the second blade.

16. The turbomachine blade arrangement according to claim 1, wherein a main movement direction of the second element of the second guide of the first blade is perpendicular to a main movement direction of the second element of the second guide of the second blade.

* * * * *